United States Patent [19]

Allen et al.

[11] 4,182,053
[45] Jan. 8, 1980

[54] DISPLAY GENERATOR FOR SIMULATING VEHICLE OPERATION

[75] Inventors: Richard W. Allen, Manhattan Beach; Jeffrey R. Hogge, Los Angeles, both of Calif.

[73] Assignee: Systems Technology, Inc., Hawthorne, Calif.

[21] Appl. No.: 833,162

[22] Filed: Sep. 14, 1977

[51] Int. Cl.² ............................................. G09B 9/04
[52] U.S. Cl. .................................. 35/11 R; 35/12 N; 340/725
[58] Field of Search ................. 35/11 R, 11 A, 12 N, 35/25; 273/85 G, 85 I, 85 E, DIG. 28; 340/324 A, 324 AD, 27 NA, 723–725; 358/104; 364/805

[56] References Cited

U.S. PATENT DOCUMENTS

| | | | |
|---|---|---|---|
| 3,098,929 | 7/1963 | Kirschner | 35/12 N UX |
| 3,418,459 | 12/1968 | Purdy et al. | 340/27 NA |
| 3,507,989 | 4/1970 | Wolff | 35/25 |
| 3,641,558 | 2/1972 | Cook et al. | 340/324 A |
| 3,643,258 | 2/1972 | Balding | 340/27 NA X |
| 3,781,846 | 12/1973 | Eichelberger et al. | 340/324 A |
| 3,833,759 | 9/1974 | Yatabe et al. | 35/11 R |
| 3,911,597 | 10/1975 | Millard et al. | 35/12 N |
| 3,919,691 | 11/1975 | Noll | 340/324 A |
| 4,077,138 | 3/1978 | Foerst | 35/11 R |

Primary Examiner—Vance Y. Hum
Attorney, Agent, or Firm—Edward A. Sokolski

[57] ABSTRACT

A plurality of signals are generated to represent different simulated picture elements, such as markers, road lines, obstacles, etc., which might be encountered along the pathway of a vehicle such as an automobile or an aircraft. These signals are separated into groups representing height, longitudinal and lateral dimensions in three-dimensional space and corresponding intensity levels for each of various picture elements to be displayed, and the signals in each group are multiplexed together to form a composite signal for each of these signal components. The height, longitudinal and lateral groups of multiplexed signals are transformed to perspective form in accordance with a "perspective" transformation. Curvature may be given to the simulated pathway by transforming the composite perspective lateral signal in response to a curve signal generator. The composite horizontal signal modified in accordance with vehicle heading is fed to the horizontal control circuits of the display device. Finally, a composite multiplexed signal in accordance with the desired "intensity" of the displayed picture elements is modified in accordance with the longitudinal axis composite signal so that intensity is decreased as a function of the simulated distance of objects in the vehicle pathway.

12 Claims, 11 Drawing Figures

DISPLAY GENERATOR FOR SIMULATING VEHICLE OPERATION

This invention relates to a vehicle pathway display generator, and more particularly to such a system that can be used to simulate the operation of a vehicle to provide a perspective display of the pathway of the vehicle which can be used in training or testing operators, or be used as a synthetic display for actual vehicle operation.

It is highly desirable in the training and testing of operators of vehicles such as automobiles and aircraft, to use simulation equipment to avoid the hazards involved in actual vehicle operation, particularly with inexperienced operators. Various simulators have been developed in the prior art for simulating vehicle operation wherein a perspective display is provided, this display being varied in accordance with simulated vehicle operation. U.S. Pat. No. 3,833,759 to Yatabe et al, and U.S. Pat. No. 3,911,597 to Millard et al, describe display systems of this general type which are adapted to simulate the operation of an aircraft. Other U.S. patents which describe perspective displays of the general type employed in the present invention but wherein these displays are used in the actual in-flight operation of an aircraft, include U.S. Pat. Nos. 3,093,822, 3,309,659, 3,117,300 and 3,643,258 to Balding; U.S. Pat. No. 3,418,459 to Purdy; and U.S. Pat. No. 3,643,213 to Yurasek et al.

Most of the systems described in the aforementioned patents (all but Purdy and Yurasek) employ raster scanning in the display which limits display resolution and/or update rate as opposed to systems such as that of the present invention which utilize a direct line drawing technique. Of these prior art references, U.S. Pat. Nos. 3,093,822 and 3,643,258 to Balding, U.S. Pat. No. 3,418,459 to Purdy, and U.S. Pat. No. 3,833,759 to Yatabe all show means for generating curved paths. While both of the just mentioned Balding patents teach the generation of a relatively simple smooth curve, they have the disadvantage of employing a raster type scan. The system of the Purdy patent employs a curve which is formed from line segments and thus is not smooth. The system of the Yatabe patent employs a raster scan and involves a rather complex ground map approach in its implementation. Balding U.S. Pat. No. 3,117,300 describes a system which employs a raster scan wherein motion of the vehicle is simulated by the movement of rows of simulated elliptical holes on the ground, such simulated motion being achieved by the frequency modulation of a gated oscillator.

The system of the present invention provides an improvement over the prior art in the following manner:

First, the system of the present invention employs a technique whereby the lines of the display are drawn directly thereon without resorting to a raster scan presentation. This affords inherently higher resolution and updating of the information at a higher rate. Further, the system of the present invention has a simplicity and economy of mechanization and improved stability of operation as compared with most of the prior art systems. This end result is achieved by generating four signals representing height, lateral, longitudinal and intensity information respectively for all of the picture elements. Each of these four signals is a composite derived by multiplexing together all of the information for each of the above indicated signal components, such that the composite multiplexed signals can be readily transformed in a first circuit to perspective form and a second circuit to show curvature and heading angle of the vehicle path. All of the circuits are synchronized with each other by means of a single clock generator.

Also, the system of the present invention provides a simulation of motion which is smooth and continuous and does not have the discontinuity of motion generally present in systems utilizing raster scanning. This end result is achieved through intensity control with a slipping gated oscillator, the circuit employed being relatively simple and reliable in its implementation and affording a highly effective simulation of motion. Further, the system of the present invention employs a very simple yet stable and reliable means for simulating curved path motion as compared with implementations of this function in the prior art.

It is therefore an object of this invention to provide an improved vehicle path display generator which is simple and economical in its implementation, yet which affords accurate and stable operation.

It is a further object of this invention to provide a vehicle pathway display generator which provides a smoother simulation of vehicle motion than prior art devices.

It is another object of this invention to provide a vehicle pathway display generator having higher feature resolution and updating of information than prior art systems.

Other objects of this invention will become apparent as the description proceeds in connection with the accompanying drawings, of which:

Briefly described, the system of our invention is as follows:

Appropriate generators are provided for generating separate groups of signals representing height, lateral and longitudinal axis components, and components affording intensity control for each of the picture elements to be displayed. All of the picture element signals for each of the aforementioned groups of signal components are multiplexed together to provide a single multiplexed signal for each of the signal components (i.e., height, lateral, and longitudinal axes, and intensity). The height axis signals (Z) are fed to a perspective transformer along with the lateral and longitudinal signals (Y and X respectively), the perspective transformer also receiving a signal in accordance with the vehicle's lateral position. The output of the perspective transformer, which represents the vertical axis signals in perspective form, is fed to the vertical control circuits of a display device, such as a CRT, to afford a perspective display of the vertical components of the picture elements.

The multiplexed lateral (Y) and longitudinal (X) signals are combined by the perspective transformer into a composite horizontal perspective signal. The horizontal perspective signal then passes through a curvature and heading transformer where this signal is modified in accordance with the simulated heading of the vehicle and any curve in the vehicle pathway which may be commanded. The horizontal perspective signal thus modified is then fed to the horizontal control circuit of the display device to provide a perspective display of the horizontal component of the picture elements. Finally, the multiplexed intensity signals ("I") are transformed in accordance with the amplitude of composite multiplexed longitudinal ("X") signal, to provide a decrease in intensity as a function of the simulated distance of the display picture elements. This modified intensity control signal is fed to the intensity control circuits of the display device.

Simulation of motion is provided in the display by means of dashed line picture elements generated by a controllable slipping gated rectangular wave oscillator. The frequency of this oscillator is set so that the ratio of its period to the clock period is the same as the ratio of the length of the dash cycle to the length of the displayed pathway. The start point of this gated oscillator relative to the clock is controlled by a comparison between a sawtooth oscillator controlled by the clock and a voltage controlled sawtooth oscillator which is controlled by a voltage proportionate to simulated vehicle speed. The comparison between the two sawtooth oscillators is adjusted so that the start point of the gated oscillator can only slip to a maximum phase shift equal to one period of the gated oscillator signal and is then rapidly reset in order to provide a smooth, continuous display of vehicle motion.

Figure 1:
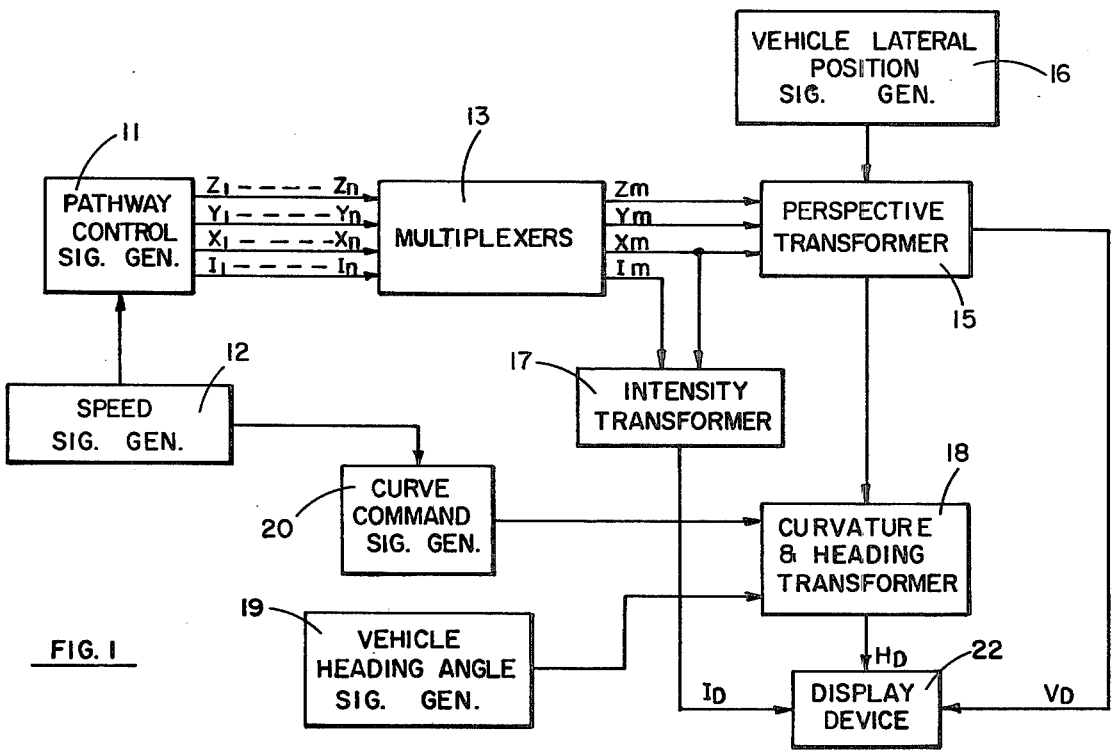
FIG. 1 is a functional block diagram showing the basic features of the system of the invention.

Referring now to FIG. 1, a block diagram is shown illustrating the basic features of the system of the invention. Pathway control signal generator 11 operates to generate a plurality of signals needed to develop the desired simulated display. These signals are preferably broken down into separate components, as in the preferred embodiment shown in FIG. 2. The simultaneously occurring outputs ($Z_1 \ldots Z_n$, $Y_1 \ldots Y_n$, $X_1 \ldots X_n$, $I_1 \ldots I_n$) of pathway control signal generator 11 are time multiplexed by means of multiplexers 13 to provide composite signals for each component of information required for generating the display. In the preferred embodiment these components include height axis information ($Z_m$), lateral axis information ($Y_m$), longitudinal axis information ($X_m$), and information for controlling the intensity of all of the displayed signals ($I_m$).

The composite multiplexed signals for height ($Z_m$), and the lateral ($Y_m$) and longitudinal ($X_m$) components are fed to perspective transformer 15. Perspective transformer 15 also receives a signal from vehicle lateral position generator 16 which signal represents the lateral position simulated for the vehicle. With these inputs, perspective transformer 15 generates a signal which represents a perspective display of the various picture elements ($V_d$), this signal being fed to the vertical control circuits of display device 22.

Composite multiplexed signals for the lateral ($Y_m$) and longitudinal ($X_m$) axes are combined by the perspective transformer into a composite horizontal perspective signal which is then fed to curvature and heading transformer 18 which also receives signals from vehicle heading signal generator 19 and curve command signal generator 20. Curvature and heading transformer 18 provides a simulated vehicle heading in response to vehicle heading signal generator 19. This transformer also responds to a curve command signal from signal generator 20 whenever a curve display is commanded. The curvature of the display varies as a smooth function of the vehicle speed by virtue of the signal fed to signal generator 20 from speed signal generator 12. The output of curvature and heading transformer 18 is fed to the horizontal control circuits of display device 22.

Finally, a composite multiplexed signal in accordance with intensity control ($I_m$) for the various display elements is fed from multiplexer 13 to intensity transformer 17 where it is multiplied by a factor which is a function of the longitudinal axis signal ($X_m$). This modification of the intensity signal in accordance with the longitudinal axis signal is needed to decrease display intensity as a function of simulated distance, thereby providing a more accurate perspective display. The output of intensity transformer ($I_d$) 17 is fed to the intensity control circuits of display device 22.

Figure 2:
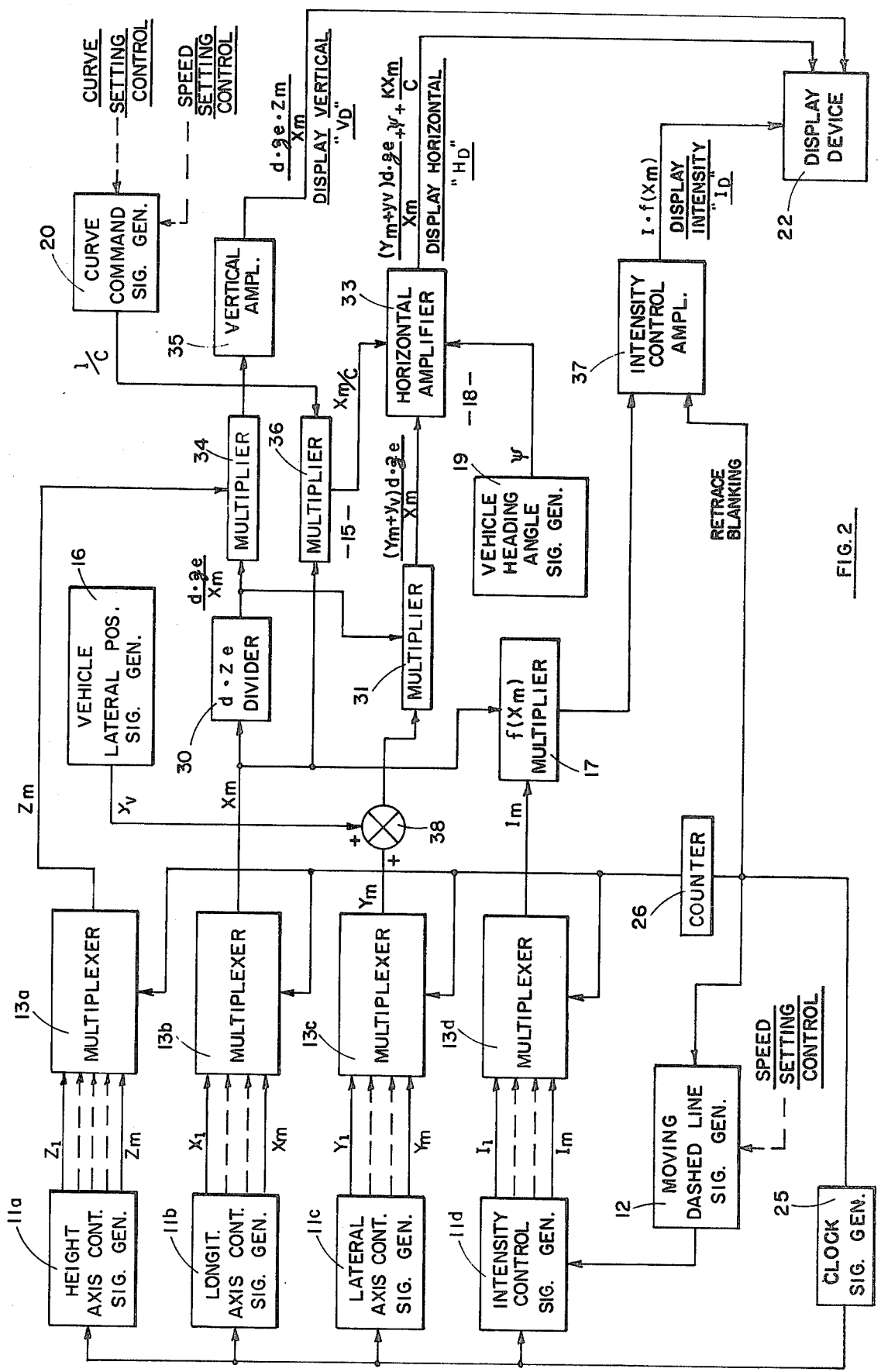
FIG. 2 is a functional block diagram of a preferred embodiment of the invention.

Referring now to FIG. 2, a preferred embodiment of the invention is illustrated. Height, longitudinal and lateral control signal generators 11a–11c generate control signals for each picture element in the display in accordance with the perspective presentation required for each of these elements. Thus, separate control signals are provided, for example, for each of the dotted, dashed, and continuous lines, and the elipse representing an obstacle illustrated in FIG. 4B. The control signals for each axis, $Z_1 \ldots Z_n$, $X_1 \ldots X_n$, and $Y_1 \ldots Y_n$, are multiplexed together in multiplexers 13a–13c respectively, to form composite position signals in three dimensional space ($Z_m$, $Y_m$, $X_m$). In similar fashion, the outputs of intensity control signal generator 11d ($I_1$–$I_n$) are multiplexed together by means of multiplexer 13d to form a composite intensity control signal ($I_m$).

A signal is provided to intensity signal control generator 11d from the moving dashed line signal generator 12 to provide an intensity variation in accordance with the rectangular wave output of signal generator 12. As to be explained further on in the specification, the phase of this rectangular wave signal is changed in accordance with a speed setting control which may be set in manually to provide a simulation of motion at various selected speeds. The operation of each of the multiplexers 13a–13d is synchronized by the output of counter 26 which in turn operates in synchronization with the output of clock signal generator 25. The operation of moving dashed line signal generator 12 is synchronized by signals received from clock generator 25.

The output, $X_m$, of multiplexer 13b is fed to "$d \cdot z_e$" divider 30. This divider operates to provide a distance perspective signal $d \cdot z_e/X_m$, which includes a factor in accordance with the distance from the eye of the observer of the display to the display screen plane, d, and a distance, $z_e$, in accordance with the elevation of the observer's eye from the ground plane of the simulated pathway for the vehicle. The output, $d \cdot z_e/X_m$, of divider 30 is fed to multiplier 34 where it is multiplied with the output, $Z_m$, of multiplexer 13a which represents the height control signal. It is to be noted that the height control signal indicates the height of objects along the vehicle pathway above the pathway level. The output of multiplier 34 is fed to vertical amplifier 35 and thence to the vertical control circuits of display device 22. This signal, $d \cdot z_e \cdot Z_m/X_m$, is directly proportional to the height control signal, $Z_m$, and the observer eye level, $z_e$, and the display screen distance, d, and inversely proportional to the longitudinal signal, $X_m$.

The lateral composite signal, $Y_m$, is fed from multiplexer 13c to summing device 38, wherein it is summed with the output of vehicle lateral position signal generator 16. This adds a factor to the horizontal signal in accordance with the lateral position of the vehicle, ($y_v$). The output of adder 38 is fed to multiplier 31 which receives a signal from the output of divider 30 in accordance with $d \cdot z_e/X_m$. Thus, the output of multiplier 31 is $(Y_m + y_v) d \cdot z_e/X_m$. The output of multiplier 31 is fed to horizontal amplifier 33. Amplifier 33 also receives a vehicle heading signal $\phi$ from vehicle heading signal generator 19 as well as a signal $K \cdot X_m/C$ from multiplier 36. These last two signals are added in amplifier 33 to the output of multiplier 31. The output of horizontal amplifier 33 is fed to display scope 22 to provide a control signal for the horizontal control circuit thereof. The curve command signal K/C is generated by curve command signal generator 20 which may operate in response to manually or automatically operated curve setting controls and is smoothly varied in response to a signal according to vehicle speed which is fed thereto from a speed setting control. It can be shown that the curve command signal, $K_c$, is substantially as follows:

$$K_c = X_m^2/2C \qquad (1)$$

where C is the radius of curvature of the curve to be simulated. It is to be noted that the square exponent is eliminated from "$X_M$" in equation (1) by taking the signal from before divider 30. If the signal were taken from the output of divider 30 (where it normally would have been taken), the "$X_m$" in the denominator of the equation so derived would operate to reduce "$X_m^2$" to "$X_m$" in the numerator, leaving the signal as it now stands.

The output, I, of multiplexer 13d is fed to the $f(X_m)$ multiplier 17 where it is multiplied by a function of $X_m$. This operation is used so as to make the intensity decrease as a function of the simulated distance on the display, thereby making for a more life-like perspective presentation. The output of multiplier 17 is fed to intensity control amplifier 37 which provides a control signal for controlling the intensity of the display on scope 22. Retrace blanking is provided to intensity control amp 37 from clock signal generator 25 to blank out the sweep retracer between picture elements.

Figures 3A, 3B, 3C, 3D:
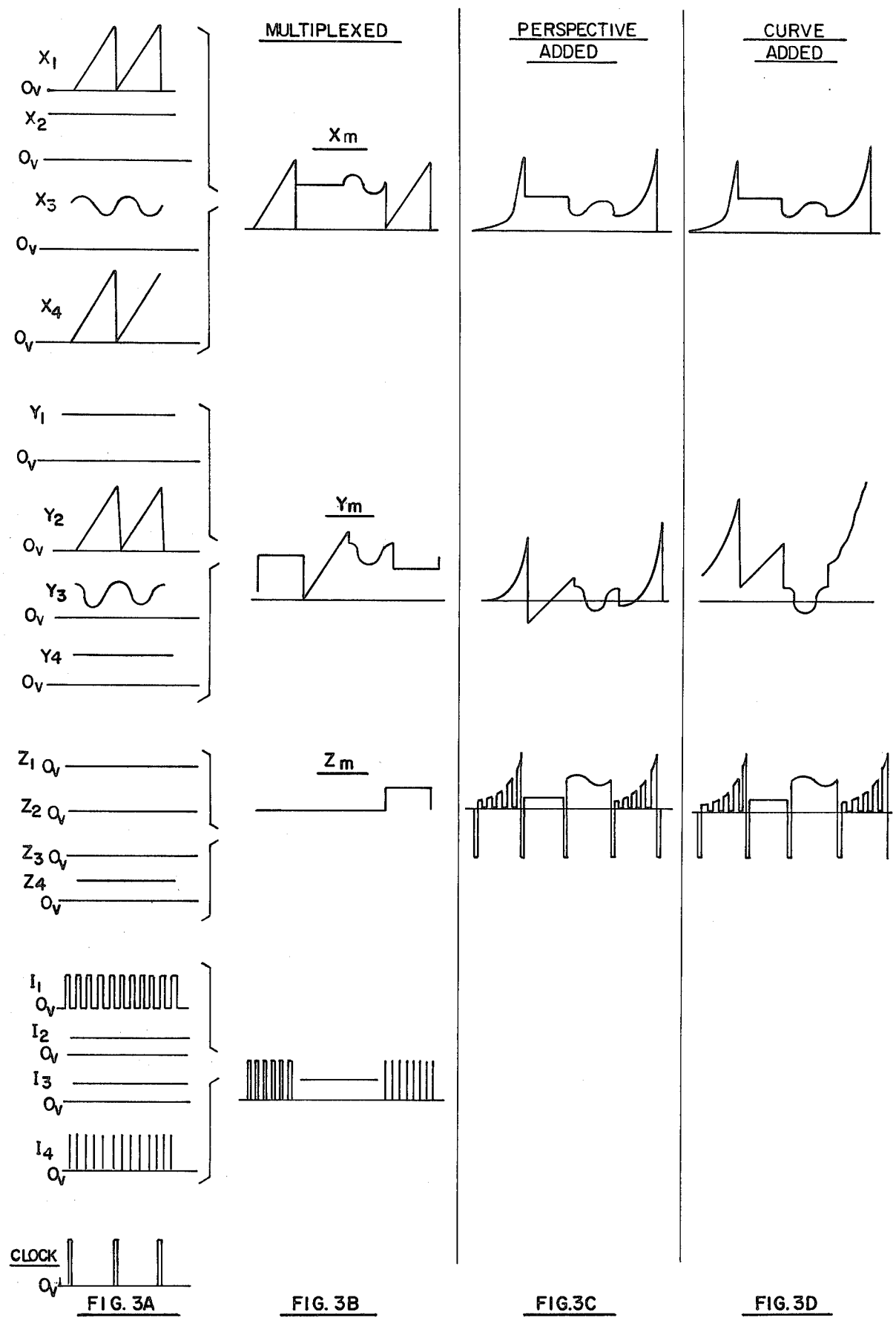
FIGS. 3A–3D show a series of waveform illustrations illustrating the operation of the preferred embodiment.
Figure 4A:
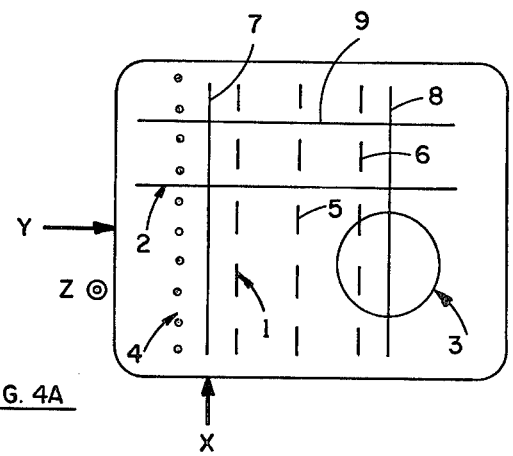
FIGS. 4A–4C are a series of illustrations showing the development of a display in the preferred embodiment.

Referring now to FIGS. 4A-4C and 3A-3D, the development of a typical display in the system of the invention is illustrated. FIG. 4A shows the combined outputs of the vertical and horizontal multiplexers for a group of display elements which include dashed lines 1, 5 and 6 which represent lane markers along a pathway, a dotted line 4 representing markers elevated above the surface of the pathway, lines 7 and 8 representing the edges of the pathway, horizontal lines 2 and 9 representing an intersection along the pathway, and circle 3 representing an obstacle on the pathway. It is to be noted that these various elements can be generated as needed to represent a desired pattern of pathway conditions.

Referring now to FIGS. 3A-3D, the signal components for generating elements 1-4 are respectively shown in FIG. 3A by the longitudinal wave forms labelled "$X_1-X_4$" respectively. The same FIG. 3A shows the lateral wave forms labelled "$Y_1-Y_4$", the height wave forms "$Z_1-Z_4$" and the intensity wave forms "$I_1-I_4$" for developing the corresponding display elements 1-4 of FIG. 4A. Thus, the wave forms $X_1$, $X_4$ and $Z_2$ for developing straight lines 1, 4 and 2 are sawtooths, while the signals, $Z_3$ and $X_3$, are sine waves of the same frequency but in quadrature relationship for developing circle 3.

Figure 4B:
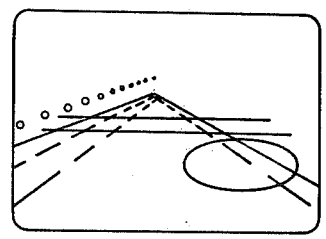
Figure 4C:
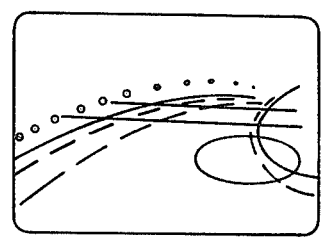

FIG. 3B illustrates the various signals after they have been multiplexed together, these various components retaining their original shape but now being sampled and multiplexed in time sequence. FIG. 3C illustrates the signals after they have been transformed to perspective form. This perspective display is illustrated in FIG. 4B. These signals, as can be seen, are modified considerably both in amplitude and wave form to provide the perspective transformation. Finally, FIG. 3D shows the display horizontal, vertical and intensity signal as modified to provide a curvature in the vehicle pathway, as illustrated in FIG. 4C.

It is to be noted that the dots identified by the numeral 4 in FIG. 4A represent reflectors which are above the surface of the pathway. A three dimensional appearance of these elements is afforded by the display intensity signal, shown in FIG. 3C.

Figure 5:
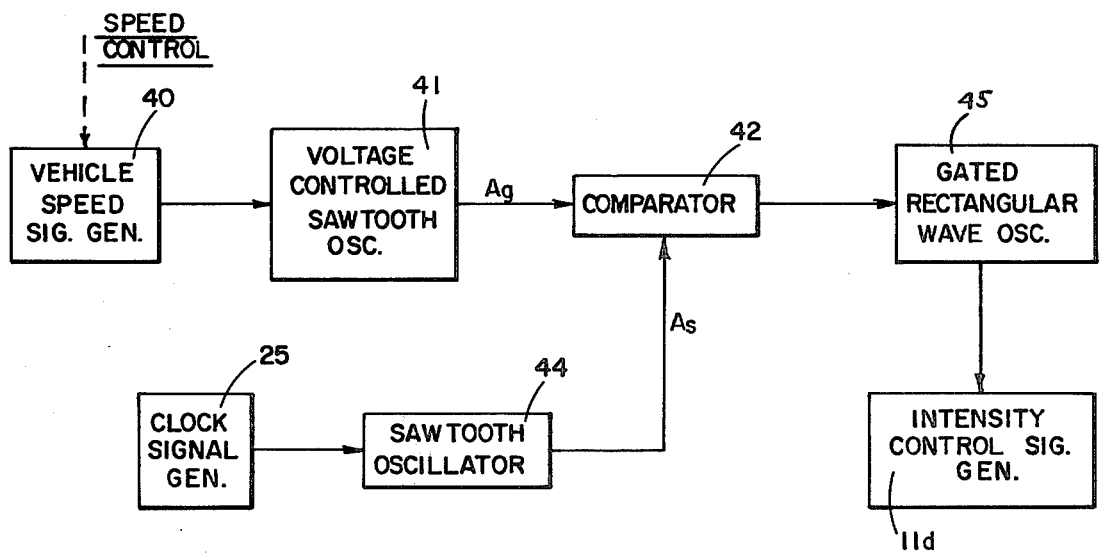
FIG. 5 is a functional block diagram illustrating a slipping gated oscillator circuit that is employed in the preferred embodiment.
Figure 6:
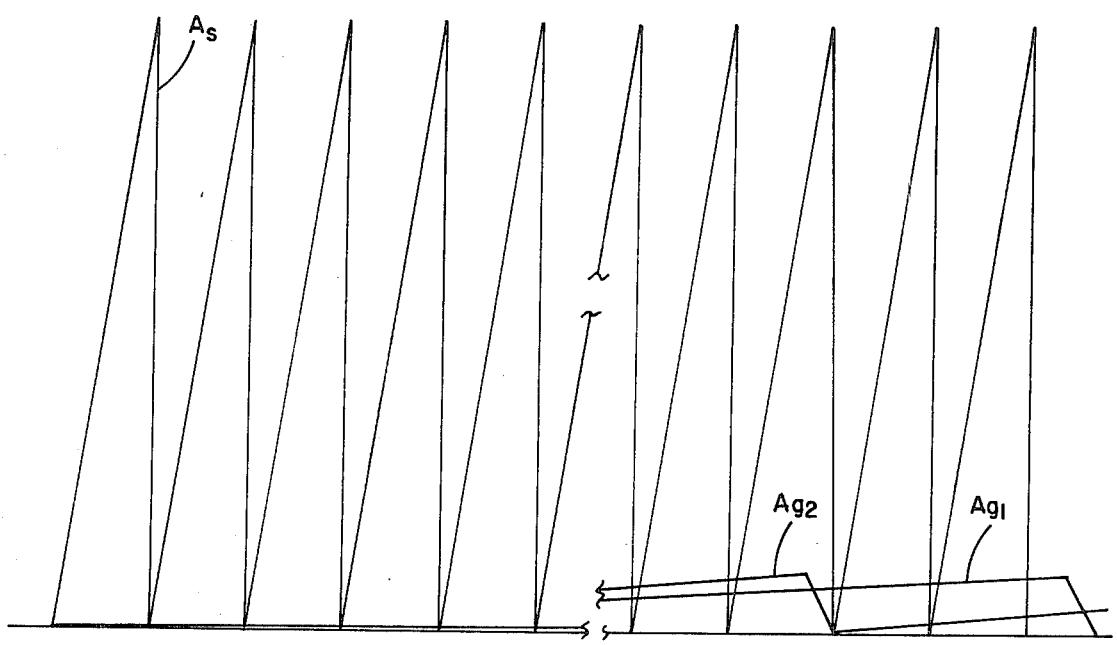
FIG. 6 shows a series of waveforms illustrating the operation of the circuit of FIG. 5.

Referring now to FIGS. 5 and 6, a functional block diagram of a slipping gated oscillator circuit for controlling simulated motion and wave forms associated therewith are respectively shown. Vehicle speed signal generator 40 provides a DC voltage output in accordance with the simulated speed desired on the display. This speed signal may be set automatically or adjusted by means of a manual control. The output of vehicle speed signal generator 40 is fed to voltage controlled sawtooth oscillator 41 and is used to control the frequency of this oscillator. Clock signal generator 25 is a system clock and is used to precisely control the frequency of sawtooth oscillator 44. The output, $A_s$, of sawtooth oscillator 44 and the output, $A_g$, of voltage controlled sawtooth oscillator 41 are fed to comparator 42. Whenever the signals, $A_g$ and $A_s$, have equal values, comparator 42 generates a pulse output. Typically, this end result may be achieved by feeding signals, $A_g$ and $A_s$, to the comparator in opposite polarity relationship so that whenever the sum of these two signals is equal to zero, the comparator will generate an output. The output of comparator 42 is fed to gated square wave oscillator 45, the output of which is synchronized with the comparator output. The output of gated rectangular wave oscillator 45 is fed to intensity control signal generator 11d to provide a pulsing blanking signal for the intensity control, this signal operating to generate the dashed line displays, such as indicated by numerals 1, 5 and 6 in FIG. 4A. The output of gated rectangular wave oscillator is made to slip in phase relative to the sawtooth output of oscillator 44 which is synchronized with the clock pulse generator. This phase difference in the blanking signal from that of the synch signal for the system gives an appearance of motion to the dashed lines on the display.

Typically, the synchronization frequency, which frequency is assumed by the sawtooth, $A_s$, is of the order of one kHz, while the frequency of the signal $A_g$ is typically about 1/1000 of that of the signal $A_s$ (of the order of 1 Hertz). The amplitude of signal $A_g$ should be kept constant, and for optimum results, the peak amplitude, $A_{gp}$, of signal $A_g$ should be determined as follows:

$$A_{gp} = T_s/T_g \times A_{sp} \qquad (2)$$

where
- $T_s$ = the period of signal $A_s$
- $T_g$ = the period of signal $A_g$ and
- $A_{sp}$ = the peak amplitude of signal $A_s$.

This adjustment allows the start point of the gated oscillator to slip to a maximum phase shift equal to one period of the gated oscillator signal and is then rapidly reset in order to provide a smooth continuous display of vehicle motion.

FIG. 6 illustrates a typical set of wave forms which may be employed with the signal $A_g$ having a peak amplitude 1/10th of that of the signal $A_s$. In FIG. 6, a pair of signals $A_{g1}$ and $A_{g2}$ having different periods are shown for illustrative purposes. Outputs will be generated from comparator 42 of FIG. 5 each time the waveform of $A_{g1}$ or $A_{g2}$ crosses that of $A_s$ which indicates equal amplitudes for the two signals. As can be seen, this will provide a signal which has a continually changing phase relationship with the synchronization signal, thereby resulting in the appearance of motion of the dashed lines. As can be seen, the wave $A_{g1}$ crosses $A_s$ slightly sooner than does $A_{g2}$, thereby simulating a different apparent speed of motion.

While this invention has been described and illustrated in detail, it is to be clearly understood that this is by way of illustration and example only and is not to be taken by way of limitation, the spirit and scope of this invention being limited only by the terms of the following claims.

We claim:

1. A system for providing a display of picture elements which are controlled to indicate the simulated or actual operation of a vehicle along a pathway comprising:
   means for generating a first group of control signals for controlling the "X" axis components of said picture elements,
   means for generating a second group of control signals for controlling the "Y" axis components of said picture elements,
   means for generating a third group of control signals for controlling the "Z" axis components of said picture elements,
   means for generating a fourth group of control signals for controlling the intensity of said picture elements,
   first-fourth means for separately multiplexing the signals in said first-fourth groups together respectively to form a composite signal for each of said groups,
   first means for transforming said first group of multiplexed signals to perspective form in response to said third group of multiplexed signals,
   second means for transforming said second multiplexed group of signals to perspective form in response to said first group of multiplexed signals, and
   a display device having horizontal deflection, vertical deflection and intensity control circuits,
   the multiplexed fourth group of signals being fed to the intensity control circuits of said display device to control the intensity of said picture elements and the output of said transforming means for the first and second groups of signals being fed to the vertical and horizontal deflection control circuits of said display device respectively to drive said control circuits to generate the longitudinal, lateral and height (X, Y, Z) axis picture element components.

2. The system of claim 1 and further including means for generating a signal in accordance with vehicle heading, means for generating a signal representing a curve command, and means responsive to said vehicle heading and curve command signals for transforming the output of the said second perspective transformer means so as to provide a representation of vehicle heading angle and path curvature on said display device.

3. The system of claim 1 and further including multiplier means for multiplying the multiplexed fourth group of signals by a factor in accordance with the multiplexed first group of signals to vary the intensity of the picture elements as an inverse function of the distance thereof.

4. The system of claim 1 wherein the means for generating said fourth group of control signals includes means for providing a phase varying pulsed signal to control the intensity of at least one of the picture elements so as to simulate vehicle motion.

5. The system of claim 4 wherein the means for providing a phase varying pulsed signal includes a first sawtooth oscillator, clock means for controlling the frequency of said first sawtooth oscillator, a second voltage controlled sawtooth oscillator having an output with both frequency and amplitude substantially lower than that of said first oscillator, means for generating a voltage representing vehicle speed for controlling the oscillation rate of said second oscillator, comparator means for generating a gating signal whenever the amplitudes of the first and second oscillator signals are equal, and an oscillator for providing the phase varying pulsed signal in response to the gating signal.

6. The system of claim 1 and further including means for generating a signal in accordance with the lateral position of said vehicle, said last mentioned signal being added to the multiplexed second group of signals.

7. The system of claim 1 and further including clock means for synchronizing the operation of all of said multiplexer means with each other.

8. The system of claim 1 and further including means for dividing the multiplexed second group of signals into a signal which is the product of a signal in accordance with the distance of an operator's eyes from the plane of the display and a signal in accordance with the height of the operator's eyes above the surface of the simulated pathway.

9. The system of claim 1 wherein the vehicle is an automobile and the pathway a road, the picture elements comprising representations of lane markers, the sides of the road, reflectors along the road and an obstacle on the road.

10. In a display generator for use in providing a display of picture elements,
   means for generating a plurality of groups of control signals, each of said groups representing a different control signal component for developing the picture elements,
   means for multiplexing the signals in each of said groups to form a composite signal for each of said groups, said composite signals including signals for controlling lateral and longitudinal and height (X, Y, and Z) axis picture element components and the intensity of said picture elements,
   said signals for controlling the intensity of said picture elements including means for providing a phase varying pulsed signal to control the intensity of at least one of the picture elements thereby simulating vehicle motion, and display means for displaying said picture elements in response to said composite signals.

11. The display generator of claim 10 wherein the means for providing a phase varying pulsed signal includes a first sawtooth oscillator clock means for controlling the frequency of said first oscillator, a second voltage controlled sawtooth oscillator having an output with both frequency and amplitude substantially lower than that of said first oscillator, means for generating a voltage representing vehicle speed for controlling the phase of said second oscillator, comparator means for generating a gating signal whenever the amplitudes of the first and second oscillator signals are equal, and an oscillator for providing the phase varying signal in response to the gating signal.

12. In a display generator for use in providing a display of picture elements, means for generating a plurality of groups of control signals, each of said groups representing a different control signal component for developing the picture elements, means for multiplexing the signals in each of said groups to form a composite signal for each of said groups, said composite signals including signals for controlling lateral and longitudinal and height (X, Y, and Z) axis picture element components and the intensity of said picture elements, transformation means for transforming the multiplexed composite signals to a form wherein they indicate perspective, said transforming means including means for multiplying the inverse of said composite longitudinal axis signal by said composite height axis signal and means for multiplying the composite lateral axis signal by the inverse of said composite longitudinal axis signal, and display means for displaying said picture elements in response to said composite signals.

* * * * *